US009206959B2

(12) United States Patent
Kashiwagi et al.

(10) Patent No.: US 9,206,959 B2
(45) Date of Patent: Dec. 8, 2015

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventors: Akihiro Kashiwagi, Shiojiri (JP); Shigeo Nojima, Azumino (JP); Akira Miyamae, Suwa-gun (JP); Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 244 days.

(21) Appl. No.: 13/758,385

(22) Filed: Feb. 4, 2013

(65) Prior Publication Data

US 2013/0201456 A1 Aug. 8, 2013

(30) Foreign Application Priority Data

Feb. 7, 2012 (JP) .................. 2012-024056

(51) Int. Cl.
*G03B 21/20* (2006.01)
*H04N 9/31* (2006.01)
*F21V 9/16* (2006.01)
*H05B 33/14* (2006.01)

(52) U.S. Cl.
CPC ............. *F21V 9/16* (2013.01); *G03B 21/204* (2013.01); *H04N 9/3158* (2013.01); *H05B 33/14* (2013.01); *H04N 9/3111* (2013.01)

(58) Field of Classification Search
CPC ...................................... G03B 21/204
USPC ........................ 353/84, 94, 31; 362/260, 293
See application file for complete search history.

(56) References Cited

U.S. PATENT DOCUMENTS

| 7,547,114 B2 | 6/2009 | Li et al. |
| 2002/0084745 A1 | 7/2002 | Wang et al. |
| 2008/0074029 A1 | 3/2008 | Suehiro |
| 2008/0206910 A1 | 8/2008 | Soules et al. |
| 2008/0284315 A1 | 11/2008 | Tasumi et al. |
| 2009/0185589 A1 | 7/2009 | Hattori et al. |
| 2010/0328617 A1 | 12/2010 | Masuda |
| 2011/0051102 A1 | 3/2011 | Ogura et al. |
| 2011/0149549 A1 | 6/2011 | Miyake |
| 2011/0292349 A1* | 12/2011 | Kitano et al. .......... 353/31 |
| 2011/0310349 A1* | 12/2011 | Yanai ..................... 353/20 |
| 2011/0310362 A1 | 12/2011 | Komatsu |
| 2013/0076234 A1 | 3/2013 | Enomoto et al. |

FOREIGN PATENT DOCUMENTS

| JP | A 2008-71837 | 3/2008 |
| JP | 2008-078225 A | 4/2008 |
| JP | 2009-231785 A | 10/2009 |

(Continued)

OTHER PUBLICATIONS

Aug. 14, 2014 Office Action issued in U.S. Appl. No. 13/758,499.

(Continued)

*Primary Examiner* — William C Dowling
*Assistant Examiner* — Ryan Howard
(74) *Attorney, Agent, or Firm* — Oliff PLC

(57) ABSTRACT

A wavelength conversion element includes a substrate, and a fluorescent material layer disposed on the substrate. The volume concentration of the fluorescent material in the fluorescent material layer is equal to or higher than 15 vol %.

19 Claims, 3 Drawing Sheets

(56) References Cited

FOREIGN PATENT DOCUMENTS

| | | |
|---|---|---|
| JP | A 2010-4034 | 1/2010 |
| JP | A 2010-4035 | 1/2010 |
| JP | A 2010-157638 | 7/2010 |
| JP | 2011-012215 A | 1/2011 |
| JP | A 2011-53320 | 3/2011 |
| JP | A 2011-91068 | 5/2011 |
| JP | 2011-168627 A | 9/2011 |
| JP | 2012-003923 A | 1/2012 |
| JP | 2012-018209 A | 1/2012 |
| JP | 2012-018762 A | 1/2012 |
| JP | A 2012-74273 | 4/2012 |
| JP | A 2012-83695 | 4/2012 |
| JP | 2013-072041 A | 4/2013 |

OTHER PUBLICATIONS

Jan. 20, 2015 Office Action issued in U.S. Appl. No. 13/758,499.
May 7, 2015 Office Action issued in U.S. Appl. No. 13/758,499.

\* cited by examiner

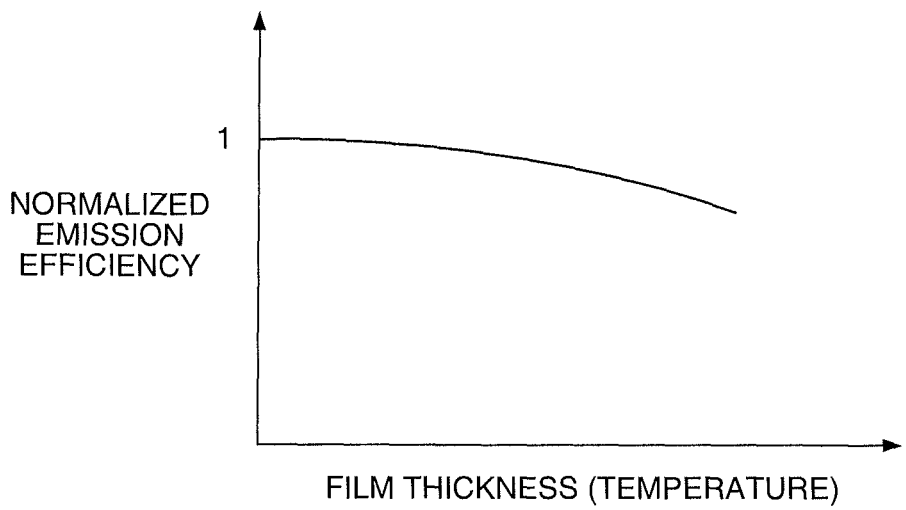
FIG. 4
CONCENTRATION AND FILM FORMATION
| CONCENTRATION | 40Vol% | 50Vol% | 60Vol% | 70Vol% |
|---|---|---|---|---|
| FILM QUALITY | ○ | ○ | × | × |
FIG. 5
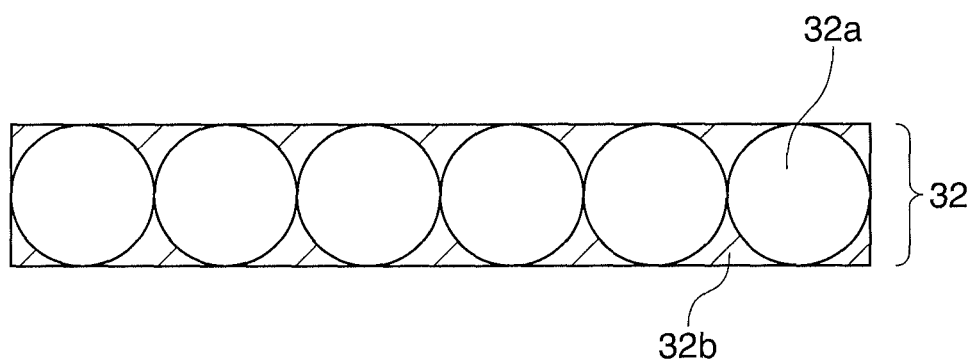
FIG. 6

WAVELENGTH CONVERSION ELEMENT, LIGHT SOURCE DEVICE, AND PROJECTOR

BACKGROUND

1. Technical Field

The present invention relates to a wavelength conversion element, a light source device, and a projector.

2. Related Art

In recent years, regarding the improvement in performance of a projector, there has been known a device provided with a laser source and a fluorescent material layer, which is exited by the laser beam emitted by the laser source to thereby emit fluorescence light, as a light source device with a wide color gamut and high efficiency (see, e.g., JP-A-2011-53320).

Incidentally, since the fluorescent material layer with a large film thickness has a poor heat rejection property, the temperature of the fluorescent material layer rises as the light intensity of the excitation light is increased. Further, there might arise the problem that the phenomenon called thermal quenching occurs to thereby degrade the luminous efficiency. However, in the related art described above, although the condition in which high luminous efficiency can be obtained is defined by the weight rate of the phosphor, the degradation of the luminous efficiency due to the thermal quenching described above is not considered, and therefore, it is difficult to say that the high luminous efficiency can be obtained in the entire range.

SUMMARY

An advantage of some aspects of the invention is to provide a wavelength conversion element, a light source, and a projector capable of providing high luminous efficiency.

An aspect of the invention is directed to a wavelength conversion element including a fluorescent material layer including a fluorescent material and a binder, and a volume concentration of the fluorescent material in the fluorescent material layer is one of equal to and higher than 15 vol %.

According to the wavelength conversion element of this aspect of the invention, since the volume concentration of the fluorescent material is equal to or higher than 15 vol %, high emission efficiency can be obtained throughout a broad film thickness range of the fluorescent material layer as shown in the result described later.

Further, in the wavelength conversion element described above, it is preferable that the volume concentration of the fluorescent material in the fluorescent material layer is one of equal to and higher than 17 vol %. According to this configuration, since the volume concentration of the fluorescent material is set to be equal to or higher than 17 vol %, higher emission efficiency can be obtained.

Further, in the wavelength conversion element described above, it is preferable that the volume concentration of the fluorescent material in the fluorescent material layer is one of equal to and lower than 50 vol %. According to this configuration, since the fluorescent material layer with preferable film quality can easily be formed, high emission efficiency can easily be obtained.

Further, in the wavelength conversion element described above, it is preferable that the volume concentration of the fluorescent material in the fluorescent material layer is lower than 50 vol %. According to this configuration, uniform emission intensity can easily be obtained.

Further, in the wavelength conversion element described above, it is preferable that a thickness of the fluorescent material layer is one of equal to and smaller than 150 μm.

According to this configuration, since the thickness of the fluorescent material layer is set to be equal to or smaller than 150 μm, high emission efficiency can be obtained as shown in the result described later.

Further, in the wavelength conversion element described above, it is preferable that the thickness of the fluorescent material layer is one of equal to and smaller than 100 m. According to this configuration, since the thickness of the fluorescent material layer is set to be equal to or smaller than 100 μm, higher emission efficiency can be obtained.

Another aspect of the invention is directed to a light source device including the wavelength conversion element described above, and an excitation light source adapted to excite the wavelength conversion element.

According to the light source device of this aspect of the invention, since the wavelength conversion element capable of obtaining such high emission efficiency as described above is provided, the light source device provided with the wavelength conversion element has high emission efficiency and high reliability.

Further, in the light source device described above, it is preferable that the excitation light source which includes a plurality of solid-state light emitting elements, collects excitation light, and then makes the excitation light enter the wavelength conversion element. According to this configuration, since the plurality of solid-state light emitting elements is provided, the wavelength conversion element can preferably be irradiated with the excitation light.

Further, in the light source device described above, it is preferable that the fluorescent material layer is rotated to thereby sequentially change an irradiation position irradiated by the excitation light source with respect to the fluorescent material layer. According to this configuration, since the irradiation position with the excitation light with respect to the fluorescent material layer is sequentially changed, it is possible to prevent the fluorescent material layer from generating heat due to the local irradiation with the excitation light.

Still another aspect of the invention is directed to a projector including the light source device described above, a light modulation element adapted to modulate light emitted from the light source device with an image signal, and a projection optical system adapted to project the light modulated by the light modulation element.

According to the projector of this aspect of the invention, since the light source device capable of obtaining such high emission efficiency as described above is provided, the projector itself provided with the light source device is also provided with high emission efficiency and high reliability.

BRIEF DESCRIPTION OF THE DRAWINGS

The invention will be described with reference to the accompanying drawings, wherein like numbers reference like elements.

FIG. 4 is a graph showing a relationship between the thickness of the fluorescent material layer and normalized luminous efficiency.

FIG. 5 is a table for explaining an upper limit of the volume concentration of the fluorescent material in the fluorescent material layer.

FIG. 6 is a diagram for explaining a lower limit of the film thickness in the fluorescent material layer.

DESCRIPTION OF AN EXEMPLARY EMBODIMENT

Figure 1:
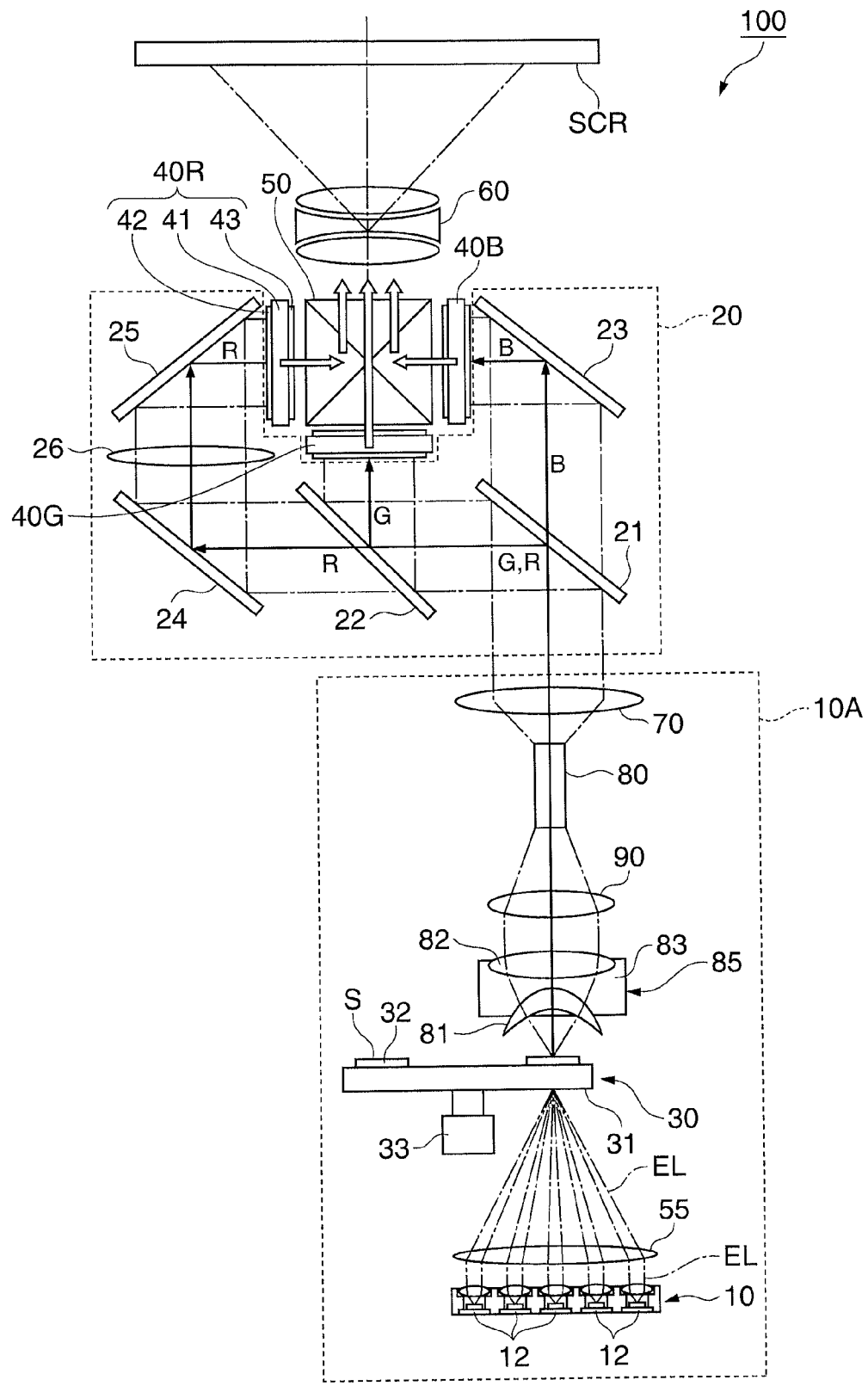
FIG. 1 is a schematic diagram showing an optical system of a projector.

Hereinafter, an embodiment of the invention will be described with reference to the accompanying drawings. The embodiment shows an aspect of the invention, but do not limit the scope of the invention, and can arbitrarily be modified within the technical concept of the invention. Further, in the drawings explained hereinafter, in order to make each of the constituents easy to understand, the constituents are different in scale size, number, and so on from those in the actual structure.

FIG. 1 is a schematic diagram showing an optical system of a projector including an illumination device to which a light source device according to the invention is applied. As shown in FIG. 1, the projector 100 is provided with the light source device 10A, a color separation light guide optical system 20, a liquid crystal light modulation device 40R, a liquid crystal light modulation device 40G, and a liquid crystal light modulation device 40B as a light modulation device, a cross dichroic prism 50, and a projection optical system 60. The light source device 10A is provided with an excitation light source 10, a first collecting lens 55, a rotating fluorescent plate 30, a collimating optical system 85, a second collecting lens 90, a rod integrator 80, and a collimating lens 70. In other words, on the light path of the excitation light EL emitted from the excitation light source 10, there are disposed the first collecting lens 55, the rotating fluorescent plate 30, the collimating optical system 85, the second collecting lens 90, the rod integrator 80, and the collimating lens 70 in this order.

The excitation light source 10 is formed of a laser source array having a plurality of laser sources 12 arranged two-dimensionally along a row direction and a column direction. It should be noted that the laser source array constitutes a solid-state light emitting element according to the invention.

The laser sources 12 are each formed of a laser diode for emitting a laser beam of a blue color (having a peak emission intensity at around 450 nm) as the excitation light EL for exciting the fluorescent material provided to the rotating fluorescent plate 30 described later. By using the laser sources 12 each formed of the laser diode as described above, the power consumption of the excitation light source 10 can be reduced. It should be noted that the laser source 12 can also be a light source for emitting the colored light having a peak wavelength other than 450 nm providing the light has the wavelength with which the fluorescent material described later can be excited.

The color separation light guide optical system 20 is provided with dichroic mirrors 21, 22, reflecting mirrors 23, 24, and 25, and a relay lens 26. The color separation light guide optical system 20 has a function of separating the light from the light source device 10A into red light, green light, and blue light, and then guiding the colored lights of the red light, the green light, and the blue light to the liquid crystal light modulation devices 40R, 40G, and 40B to be the illumination objects, respectively.

The dichroic mirrors 21, 22 are each a mirror having a wavelength selecting transmissive film formed on a substrate, the wavelength selecting transmissive film reflecting the light in a predetermined wavelength band and transmitting the light in another wavelength band. Specifically, the dichroic mirror 21 transmits the blue light component while reflecting the red light component and the green light component. The dichroic mirror 22 reflects the green light component while transmitting the red light component.

The reflecting mirrors 23, 24, and 25 are each a mirror for reflecting the incident light. Specifically, the reflecting mirror 23 reflects the blue light component having been transmitted through the dichroic mirror 21. The reflecting mirrors 24, 25 reflect the red light component having been transmitted through the dichroic mirror 22.

The blue light having been transmitted through the dichroic mirror 21 is reflected by the reflecting mirror 23, and then enters an image forming area of the liquid crystal light modulation device 40B for the blue light. The green light having been reflected by the dichroic mirror 21 is further reflected by the dichroic mirror 22, and then enters the image forming area of the liquid crystal light modulation device 40G for the green light. The red light having been transmitted through the dichroic mirror 22 enters the image forming area of the liquid crystal light modulation device 40R for the red light via the reflecting mirror 24 on the entrance side, the relay lens 26, and the reflecting mirror 25 on the exit side.

As the liquid crystal light modulation devices 40R, 40G, and 40B, those generally known can be used, and the liquid crystal light modulation devices 40R, 40G, and 40B are each formed of a light modulation such as a transmissive liquid crystal light valve having a liquid crystal element 41 and polarization elements 42, 43 sandwiching the liquid crystal element 41 therebetween. The polarization elements 42, 43 have, for example, a configuration (a cross-Nicol arrangement) having the transmission axes perpendicular to each other.

The liquid crystal light modulation devices 40R, 40G, and 40B are for modulating the respective colored lights having input thereto in accordance with the image information to thereby form a color image, and constitute the illumination object of the light source device 10A. The light modulation of the respective colored lights having input thereto is performed by the liquid crystal light modulation devices 40R, 40G, and 40B.

For example, the liquid crystal light modulation devices 40R, 40G, and 40B are each a transmissive liquid crystal light modulation device obtained by encapsulating a liquid crystal material between a pair of transparent substrates, and each modulates the polarization direction of a unique linearly polarized light emitted from the polarization element 42 in accordance with the image information provided thereto using polysilicon TFTs as switching elements.

The cross dichroic prism 50 is an optical element for combining the optical images modulated for respective colored lights emitted from the respective polarization elements 43 to thereby form a color image. The cross dichroic prism 50 has a roughly square shape in a plan view formed by bonding four rectangular prisms. On the interfaces having a roughly X shape on which the rectangular prisms are bonded to each other, there are formed dielectric multilayer films. The dielectric multilayer film formed on one of the roughly X-shaped interfaces is for reflecting the red light, and the dielectric multilayer film formed on the other of the interfaces is for reflecting the blue light. The red light and the blue light are bent by these dielectric multilayer films to have the proceeding direction be aligned with the proceeding direction of the green light, thus the three colored lights are combined with each other.

The color image emitted from the cross dichroic prism 50 is projected in an enlarged manner by the projection optical system 60 to form an image on the screen SCR.

The first collecting lens 55 is formed of, for example, a convex lens. The first collecting lens 55 is disposed on the light beam axes of the respective laser beams emitted from the excitation light source 10, and collects the excitation light EL (a plurality of laser beams) emitted from the excitation light source 10 so that the collected spot diameter is equal to or smaller than 1 mm.

Figure 2:
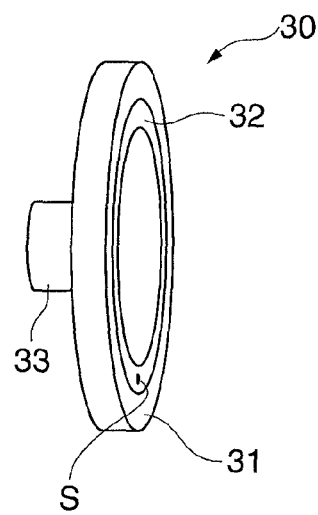
FIG. 2 is a perspective view showing a configuration of a rotating fluorescent plate.

The rotating florescent plate 30 is a so-called transmissive rotating fluorescent plate. As shown in FIG. 2, the rotating fluorescent plate 30 has a fluorescent material layer 32 formed along the rotational direction of a substrate 31 having a disk-like shape rotationally driven by an electric motor 33. The area where the fluorescent material layer 32 is formed includes an area S (hereinafter also referred to as an excitation light entrance area S in some cases) to which the excitation light EL is input. As described later, the fluorescent material layer 32 includes fluorescent material particles and a binder, and corresponds to a wavelength conversion element according to the invention. Since the substrate 31 is rotationally driven by the electric motor 33 around the rotational axis, the excitation light entrance area S moves around the rotational axis relatively to the substrate 31.

The substrate 31 is made of a material transmitting the excitation light EL. As the material of the substrate 31, there can be used quartz glass, quartz crystal, sapphire, optical glass, transparent resin, and so on. Although not shown in the drawing, a dielectric multilayer film is disposed between the substrate 31 and the fluorescent material layer 32. The dielectric multilayer film functions as a dichroic mirror, and is arranged to transmit the light around 450 nm, which is the excitation light EL, and reflect the light with the wavelength equal to or longer than 490 nm including the wavelength range (490 nm through 750 nm) of the fluorescence light emitted from the fluorescent material layer 32. It should be noted that the shape of the substrate 31 is not limited to the disk-like shape.

The fluorescent material layer 32 rotates at, for example, 7,500 rpm in use together with the substrate 31. Although the detailed explanation is omitted, the rotating fluorescent plate 30 has a diameter of 50 mm, and is configured so that the light axis of the excitation light EL entering the substrate 31 is located at the position approximately 22.5 mm distant from the rotational center of the substrate 31. In other words, the substrate 31 rotates at a rotational speed at which the collected spot of the excitation light EL moves on the fluorescent material layer 32 at about 18 m/sec.

In such a substrate 31, when the excitation light EL enters the fluorescent material layer 32, the part of the fluorescent material layer 32 corresponding to the excitation light entrance area S generates heat. Further, the part (the heat generation part) generating heat repeats the cycle of moving around the rotational axis so as to draw a circle and then returning to the location corresponding to the excitation light entrance area S due to the rotation of the substrate 31. Therefore, it is possible to sequentially change the irradiation position of the fluorescent material layer 32 irradiated with the excitation light EL. Thus, it is arranged that the heat generation part is cooled in the process of the movement.

The laser beams (the blue light) emitted from the excitation light source 10 enter the fluorescent material layer 32 via the dielectric multilayer film as the excitation light EL, and the fluorescent material layer 32 emits the fluorescence light (the red light and the green light) toward the opposite side to the side to which the excitation light EL is input.

The fluorescent material layer 32 includes the binder and the plurality of fluorescent material particles formed on the substrate. The fluorescent material particles absorb the excitation light EL (the blue light) to thereby convert it into the fluorescence light of about 490 through 750 nm (having a peak in a range of 550 through 570 nm). It should be noted that the fluorescence light includes the green light (with the wavelength of around 530 nm) and the red light (with the wavelength of around 630 nm).

For example, the fluorescent material particles include the substance, which is excited by the blue light with the wavelength of about 450 nm, and thus emits the fluorescence light, and convert a part of the excitation light EL into the light (the yellow light) including the wavelength band from the wavelength band of the red light to the wavelength band of the green light, and then emit the resulted light. It should be noted that a part of the excitation light EL is not converted into the yellow light. In other words, it is arranged that the light source device 10A emits the white light including the red light, the green light, and the blue light.

In the present embodiment, the generally known yttrium aluminum garnet (YAG) based fluorescent material can be used as the fluorescent material particles. For example, the YAG-based fluorescent material having an average particle diameter of 10 μm, and a composition represented by $(Y,Gd)_3(Al,Ga)_5O_{12}:Ce$ can be used. It should be noted that the constituent material of the fluorescent material particles 32a can be unique, or it is also possible to use the mixture of the particles formed using two or more constituent materials as the fluorescent material particles.

Further, as the binder described above, resin materials having light permeability can be used, and among these materials, silicone resin having high heat resistance can preferably be used.

The collimating optical system 85 is disposed on the light path of the light (the excitation light EL and the fluorescence light) between the rotating fluorescent plate 30 and the second collecting lens 90. The collimating optical system 85 is configured including a first lens 81 for preventing the spread of the light from the rotating fluorescent plate 30, a second lens 82 for collimating the light input from the first lens 81, and a base section 83 for fixing the lenses to each other. The first lens 81 is formed of, for example, a convex meniscus lens, and the second lens 82 is formed of, for example, a convex lens. The collimating optical system 85 makes the light from the rotating fluorescent plate 30 enter the second collecting lens 90 in a roughly collimated state. Since the light (the fluorescence light) emitted from the fluorescent material layer 32 is derived from the Lambertian emission, the collimating optical system 85 is disposed in a state adjacent to the rotating fluorescent plate 30. Specifically, the gap between the collimating optical system 85 and the rotating fluorescent plate 30 is set to, for example, roughly 1 mm.

The second collecting lens 90 is formed of, for example, a convex lens. The second lens 90 is disposed on the light axis of the light transmitted through the collimating optical system 85 (the second lens 82), and collects the light having been transmitted through the collimating optical system 85.

The light having been transmitted through the second collecting lens 90 enters one of the ends of the rod integrator 80. The rod integrator 80 is an optical member having a prismatic shape extending in the light path direction, and causes the light passing through the inside thereof the multiple reflection to thereby mix the light having been transmitted through the second collecting lens 90, and thus homogenizes the luminance distribution. The shape of the cross-section of the rod integrator 80 perpendicular to the light path direction is arranged to be roughly similar to the outer shape of the image forming area of the liquid crystal light modulation devices 40R, 40G, and 40B.

The light having been emitted from the other of the ends of the rod integrator 80 is collimated by the collimating lens 70, and then emitted from the light source device 10A.

Figure 3:
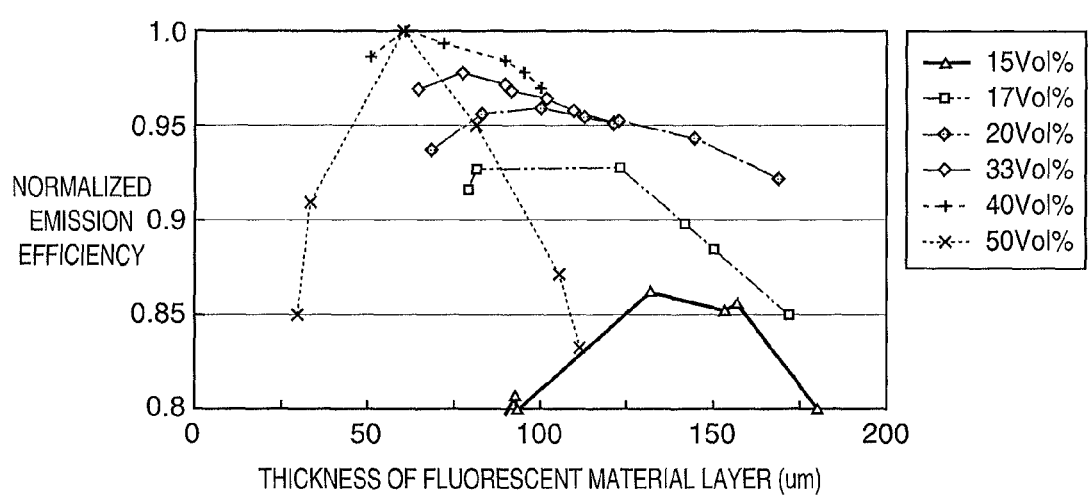
FIG. 3 is a graph showing a relationship between the thickness of the fluorescent material layer and normalized luminous efficiency.

FIG. 3 is a graph showing a relationship between the thickness (unit: μm) of the fluorescent material layer 32 and the normalized emission efficiency of the fluorescent material layer 32. Here, the emission efficiency is defined by the proportion of the light intensity of the fluorescence light emitted from the fluorescent material layer 32 with respect to the light intensity of the excitation light EL from the excitation light source 10 with which the fluorescent material layer 32 is irradiated. Specifically, the case in which the emission efficiency is 100% denotes the case in which the light intensity of the excitation light EL emitted from the excitation light source 10 and the light intensity of the fluorescence light converted and then emitted by the fluorescent material layer 32 are equal to each other. Further, the volume concentration of the plurality of fluorescent material particles 32a in the fluorescent material layer 32 corresponds to the volume concentration of the fluorescent material in the fluorescent material layer 32. FIG. 3 shows the relationship described above when setting the volume concentration of the fluorescent material to 15 vol %, 17 vol %, 20 vol %, 33 vol %, 40 vol %, and 50 vol %. It should be noted that the normalized emission efficiency shown in FIG. 3 is normalized so that the maximum value of the emission efficiency in the case in which the volume concentration is 40 vol % corresponds to 1. In the case in which the volume concentration is 40 vol %, sufficiently high emission efficiency for practical use can be obtained.

According to the graph shown in FIG. 3, it can be confirmed that basically preferable normalized emission efficiency equal to or higher than 0.85 can be obtained providing the volume concentration of the fluorescent material is equal to or higher than 15 vol %. Further, it can be confirmed that the basically preferable normalized emission efficiency equal to or higher than 0.85 can be obtained throughout abroad film thickness range of the fluorescent material layer 32 providing the volume concentration of the fluorescent material is equal to or higher than 17 vol %.

Further, it can be confirmed that the basically preferable normalized emission efficiency equal to or higher than 0.85 can be obtained if the film thickness of the fluorescent material layer 32 is set to a level equal to or smaller than 150 μm. Further, it can be confirmed that more preferable normalized emission efficiency higher than 0.90 can be obtained if the film thickness of the fluorescent material layer 32 is set to a level equal to or smaller than 100 μm.

In contrast, it can be confirmed that the normalized emission efficiency is degraded if the film thickness of the fluorescent material layer 32 is set to a level larger than 150 μm. The reason therefor can be thought as follows.

The inventors found out the fact that the emission efficiency of the fluorescent material layer 32 dropped if the thickness of fluorescent material layer 32 was increased. FIG. 4 is a graph showing the relationship between the film thickness of the fluorescent material layer 32 and the normalized emission efficiency of the fluorescent material layer 32. It should be noted that the normalized emission efficiency shown in FIG. 4 is normalized so that the maximum value of the emission efficiency corresponds to 1. According to the graph shown in FIG. 4, it can be confirmed that the emission efficiency of the fluorescent material layer 32 drops as the thickness of the fluorescent material layer 32 increases. This is because the heat rejection property of the fluorescent material layer 32 is degraded as the thickness of the fluorescent material layer 32 increases, and the heat is accumulated inside the fluorescent material layer 32 to thereby raise the temperature of the fluorescent material layer 32. As a result, the phenomenon called thermal quenching already explained above occurs to thereby degrade the emission efficiency. It can also be said that the horizontal axis of the graph shown in FIG. 4 corresponds to the film thickness or the temperature of the fluorescent material layer 32.

Further, it can be confirmed from the graph shown in FIG. 3 that the film thickness of the fluorescent material layer 32 with which the maximum value of the emission efficiency can be obtained decreases as the volume concentration of the fluorescent material increases. Further, the maximum value of the normalized emission efficiency increases as the volume concentration of the fluorescent material increases. In other words, in the graph shown in FIG. 3, it is confirmed that the peak of the emission efficiency is shifted toward the upper left of the graph as the volume concentration of the fluorescent material increases. There are two factors for the shift. The first factor is that the number of the fluorescent material particles increases as the volume concentration increases. Since the component of the excitation light, which is converted into the fluorescence light, increases as the number of fluorescent material particles increases, substantially the same emission efficiency as that with the large film thickness can be obtained even with the small film thickness. The second factor is that the influence of the thermal quenching described above is reduced as the film thickness decreases.

Further, according to the graph shown in FIG. 3, there is a tendency that the emission efficiency drops if the film thickness decreases to a level equal to or smaller than 50 μm at the volume concentration of the fluorescent material of 50 vol %. It is conceivable that the reason therefor is that the film quality of the fluorescent material layer 32 is degraded to thereby drop the emission efficiency if the fluorescent material layer 32 has a small film thickness and high volume concentration. This reason is substantially the same as the reason for the fact described later that the upper limit of the volume concentration of the fluorescent material is defined. In the case in which the volume concentration of the fluorescent material is 50 vol %, although there is a tendency that the emission efficiency is degraded if the film thickness is reduced to a level equal to or smaller than 50 μm, the basically preferable normalized emission efficiency equal to or higher than 0.85 can be obtained throughout the relatively broad film thickness range of the fluorescent material layer 32.

FIG. 5 is a table for explaining the upper limit of the volume concentration of the fluorescent material. FIG. 5 shows the fact that the film quality is degraded if the volume concentration of the fluorescent material is higher than 50 vol %, specifically 60 vol % or 70 vol %. Here, the degradation of the film quality denotes that the surface of the film manufactured is porous. This is because it is difficult to preferably form the fluorescent material layer 32 if the volume concentration is too high. Since such a fluorescent material layer 32 with the film quality degraded cannot preferably generate the fluorescence light, the normalized emission efficiency of 0.85 fails to be obtained, and therefore, it is hard to say that sufficient emission efficiency can be obtained. Therefore, the volume concentration equal to or lower than 50 vol % is preferable.

Further, as is understood from FIG. 3, the dependency of the emission efficiency to the film thickness of the fluorescent material layer 32 in the case of the volume concentration of 50 vol % is stronger than the dependency of the emission efficiency to the film thickness of the fluorescent material layer 32 in the case of the volume concentration lower than 50 vol %. This means that in the case of the volume concentration of 50 vol %, it is necessary to enhance the uniformity of the film thickness of the fluorescent material layer 32 in order to obtain the uniform emission intensity. The variation in emission efficiency due to the rotation of the fluorescent material layer 32 can be reduced even if the variation in the film thickness of the fluorescent material layer 32 exists providing the volume concentration is lower than 50 vol %. Therefore, the volume concentration lower than 50 vol % is further preferable.

FIG. 6 is a diagram for explaining a lower limit of the film thickness of the fluorescent material layer 32. In the fluorescent material layer 32 schematically shown in FIG. 6, the diameter of the fluorescent material particle 32a and the thickness of the binder 32b constituting the fluorescent material layer 32 are equal to each other. As described above, the lower limit of the film thickness of the fluorescent material layer 32 is set to the diameter of the fluorescent material particle 32a. It can also be said that the lower limit of the film thickness of the fluorescent material layer 32 is the average grain diameter of the plurality of fluorescent material particles 32a. In the case of setting the film thickness of the fluorescent material layer 32 to the average grain diameter of the plurality of fluorescent material particles 32a, it is preferable to form the fluorescent material layer 32 so as not to be porous. This is because if the fluorescent material layer 32 is porous, the component of the excitation light, which passes through the fluorescent material layer 32 without entering the fluorescent material, increases to thereby degrade the emission efficiency. Therefore, although it is possible to set the lower limit of the film thickness of the fluorescent material layer 32 to the average grain diameter of the plurality of fluorescent material particles 32a, it is further preferable to set the film thickness of the fluorescent material layer 32 to the film thickness larger than the average grain diameter of the plurality of fluorescent material particles 32a. According to this configuration, it is difficult for the fluorescent material layer 32 to be porous, and thus it is possible to reduce the degradation of the emission efficiency. Based on such a knowledge, in the present embodiment, the film thickness of the fluorescent material layer 32 is set to be larger than the average grain diameter of the fluorescent material particles 32a and no larger than 150 μm, more preferably no larger than 100 μm. According to the rotating fluorescent plate 30 having the fluorescent material layer 32 with such a thickness, the fluorescence light can be generated with high efficiency due to the irradiation with the excitation light EL.

Based on the knowledge described above, the configuration having the fluorescent material layer 32 with the volume concentration set to be no lower than 15 vol %, and the film thickness set to be no larger than 150 μm is adopted to the rotating fluorescent plate 30 according to the present embodiment. The light source device 10A using the rotating fluorescent plate 30 having the fluorescent material layer 32 fulfilling such conditions is capable of generating the fluorescence light with high efficiency while suppressing the influence of the thermal quenching.

As described hereinabove, according to the projector 100 related to the present embodiment, since the light source device 10A capable of generating the fluorescence light with such high emission efficiency as described above is provided, the projector 100 itself is provided with high efficiency and high reliability.

It should be noted that the invention is not limited to the embodiment described above, but can arbitrarily be modified within the scope or the spirit of the invention.

The entire disclosure of Japanese Patent Application No. 2012-024056, filed on Feb. 7, 2012 is expressly incorporated by reference herein.

What is claimed is:

1. A wavelength conversion element comprising:
   a fluorescent material layer including a fluorescent material and a binder,
   wherein a volume concentration of the fluorescent material in the fluorescent material layer is one of equal to and higher than 15 vol %, and
   wherein a thickness of the fluorescent material layer is greater than 30 μm.

2. The wavelength conversion element according to claim 1, wherein
   the volume concentration of the fluorescent material in the fluorescent material layer is one of equal to and higher than 17 vol %.

3. The wavelength conversion element according to claim 1, wherein
   the volume concentration of the fluorescent material in the fluorescent material layer is one of equal to and lower than 50 vol %.

4. The wavelength conversion element according to claim 3, wherein
   the volume concentration of the fluorescent material in the fluorescent material layer is lower than 50 vol %.

5. The wavelength conversion element according to claim 1, wherein
   the thickness of the fluorescent material layer is one of equal to and smaller than 150 μm.

6. The wavelength conversion element according to claim 5, wherein
   the thickness of the fluorescent material layer is one of equal to and smaller than 100 μm.

7. A light source device comprising:
   the wavelength conversion element according to claim 1; and
   an excitation light source adapted to excite the wavelength conversion element.

8. A light source device comprising:
   the wavelength conversion element according to claim 2; and
   an excitation light source adapted to excite the wavelength conversion element.

9. A light source device comprising:
   the wavelength conversion element according to claim 3; and
   an excitation light source adapted to excite the wavelength conversion element.

10. A light source device comprising:
    the wavelength conversion element according to claim 4; and
    an excitation light source adapted to excite the wavelength conversion element.

11. A light source device comprising:
    the wavelength conversion element according to claim 5; and
    an excitation light source adapted to excite the wavelength conversion element.

12. A light source device comprising:
    the wavelength conversion element according to claim 6; and
    an excitation light source adapted to excite the wavelength conversion element.

13. The light source device according to claim 7, wherein
    the excitation light source includes a plurality of solid-state light emitting elements, and
    an excitation light emitted by the excitation light source is collected to thereby be incident on the wavelength conversion element.

14. The light source device according to claim 7, wherein the fluorescent material layer is rotated to thereby sequentially change an irradiation position irradiated by the excitation light source with respect to the fluorescent material layer.

15. A projector comprising:
the light source device according to claim 7;
a light modulation element adapted to modulate light emitted from the light source device with an image signal; and
a projection optical system adapted to project the light modulated by the light modulation element.

16. A projector comprising:
the light source device according to claim 13;
a light modulation element adapted to modulate light emitted from the light source device with an image signal; and
a projection optical system adapted to project the light modulated by the light modulation element.

17. A projector comprising:
the light source device according to claim 14;
a light modulation element adapted to modulate light emitted from the light source device with an image signal; and
a projection optical system adapted to project the light modulated by the light modulation element.

18. The wavelength conversion element according to claim 1, wherein the thickness of the fluorescent material layer is at least 50 μm.

19. The wavelength conversion element according to claim 18, wherein the thickness of the fluorescent material layer is one of equal to and smaller than 150 μm.

* * * * *